A. P. FURMAN.
APPARATUS FOR TAKING AND PROJECTING PICTURES IN COLORS.
APPLICATION FILED AUG. 4, 1920.
1,371,970.                                          Patented Mar. 15, 1921.
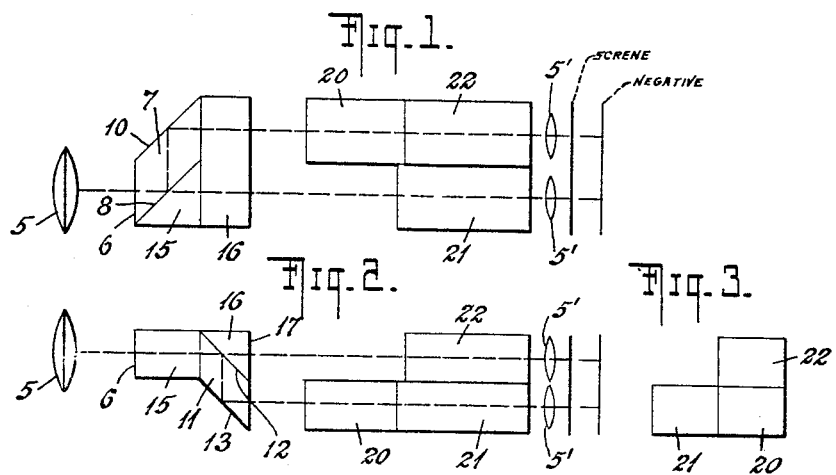
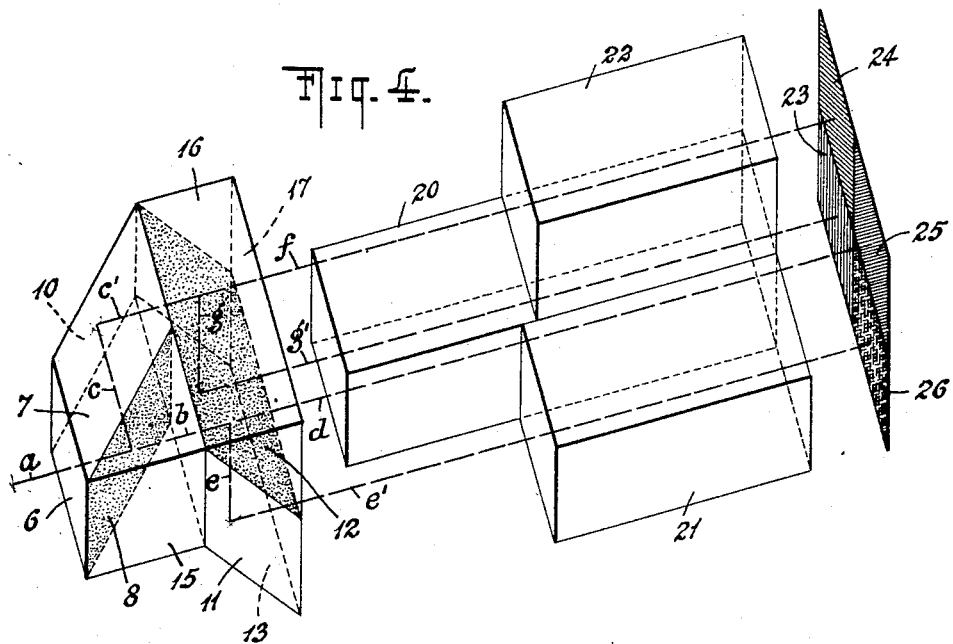

UNITED STATES PATENT OFFICE.

ABRAHAM P. FURMAN, OF NEW YORK, N. Y., ASSIGNOR TO IRA FURMAN, OF NEW YORK, N. Y.

APPARATUS FOR TAKING AND PROJECTING PICTURES IN COLORS.

1,371,970.  Specification of Letters Patent.  Patented Mar. 15, 1921.

Application filed August 4, 1920. Serial No. 401,139.

*To all whom it may concern:*

Be it known that I, ABRAHAM P. FURMAN, a citizen of the United States, and a resident of the borough and county of the Bronx, city and State of New York, have invented a certain new and useful Improvement in Apparatus for Taking and Projecting Pictures in Colors, of which the following is a specification.

This invention relates to color photography, and particularly to the production upon a suitable medium of related photographic images of complementary color selected value and the projection of such images on a screen or like surface in such a manner as to obtain an image in the natural colors of the article or object photographed.

The apparatus utilized in my invention comprises one or more lenses (acting as an objective in taking the picture, and as a projector in throwing the picture upon a screen), filters of different colors and light dividing devices of mirror character, the light passing successively through lens, color filters, and mirror devices, in any suitable order, and the relation of these parts being such as either to obtain a plurality of images (when making a photographic exposure) or to combine a plurality of photographic images into a single projected image.

The invention further contemplates the provision of means for equalizing the foreshortening of the separate light beams when the light dividing mirror devices are so arranged that some of the light beams are in effect foreshortened with respect to others.

The principle of the invention will best be understood from a description of a particular embodiment thereof, reference being had to the accompanying drawings, in which—

Figure 1 is a plan view showing an illustrative arrangement of apparatus embodying the invention;

Fig. 2 is a side view;

Fig. 3 is a front view of the same, the lens being omitted;

Fig. 4 an isometric view showing the principal parts.

The apparatus shown for the purpose of illustrating the invention comprises an arrangement of mirrors, whereby a beam of light is divided into four component beams substantially parallel to each other and preferably parallel to the original beam.

As shown, light enters the apparatus through a lens 5 and passes perpendicularly through the face 6 of the prism 7 to the mirror surface 8. This mirror surface is so prepared that approximately one-half of the impinging beam of light will be reflected and the other half will pass through, thus dividing the original beam into two beams. For convenience of description, the paths of the beams are indicated by dash lines. The original beam $a$ is divided by the mirror 8 into beams $b$ and $c$. The mirror 8, as shown, lies at an angle of about 45° to the direction of the original beam $a$ wherefore the divided beams $b$, $c$ lie at an angle of about 90° to each other. These beams are next brought into parallelism with each other. As a convenient way of accomplishing this, the prism 7 is formed with a second mirror surface 10 parallel to the mirror 8 at a suitable distance therefrom. The mirror 10 is of a character to reflect all the light impinging against it. Obviously when this surface lies at 45° to the direction of the light beam, as in the illustrated structure, no silvering is necessary.

One or both of the parallel beams $b$, $c'$, may be again divided.

As shown, a second prism 11, is provided having two parallel mirror surfaces 12, 13, the surface 12 being semi-transparent and semi-reflective and the surface 13 being totally reflective. This prism is arranged adjacent the prism 7 with one face preferably in contact therewith. The beam $b$ is divided by the semi-transparent mirror surface 12 into two beams $d$, $e$ extending at substantially right angles to each other. The beam $c'$ is similarly divided into two beams $f$, $g$. The mirror 13 serves to bring the beams into parallel relation. It is to be noted that in the particular arrangement illustrated, all the beams are in such relation that the divisional images corresponding to the image carried by the original beam will be similarly positioned when focused, *i. e.*, no image will be reversed with respect to another. This is a desirable, though not necessarily an essential, relation of the images for obvious reasons. Such relation of the images will, for example, make possible projection with other apparatus of pictures taken with the apparatus of the present invention.

A prism 15 preferably fills the space between the mirror 8 and the face of the prism 11.

Preferably also a prism 16 is provided contacting with the semi-reflective mirror surface 12 and affording a surface 17 substantially perpendicular to the emerging light beams $d$, $f$.

The surface of the prism 11 through which the light beams $e'$, $g'$ emerge after reflection from the mirror 13 is also preferably perpendicular to the direction of these beams and may be, as shown, in the same plane as the surface 17 of prism 16.

In a structure such as shown in which the semi-reflective mirrors lie at an angle of 45° to the direction of the impinging light, the filling prisms 15, 16 assist in the formation of the semi-transparent mirror surfaces by providing suitable contacting elements as will be well understood by those skilled in the art.

It is to be noted that in the structure illustrated, the different beams of light emerge from the mirror arrangement after passing different distances through the prisms. Accordingly some of the emerging beams are in effect foreshortened with respect to others. In other words, the effective lengths of the several beams from the object to the surface of the negative (when photographing) would be different, making it difficult to obtain a true focus with a single lens device. In order to neutralize this foreshortening effect, bars of refractive material, such as glass, are interposed in the paths of the light beam, the dimensions of such bars being calculated mathematically or obtained by trial, to cause all beams to focus in the same plane. The use of such corrective refractive devices permits all images to be focused with one lens 5 in front of the prisms, or by a plurality of similar lenses 5′, 5′ behind the prisms, or by a combination of both, whereas if such bars were omitted, it would be necessary to use lenses of different focal lengths behind the prisms to properly focus all images in one plane.

The beam emerging as $d$ has traveled the shortest distance and requires no correction, i. e., no equalizing bar. The beam emerging as $g'$ has traveled the greatest distance through the prisms and therefore requires the most correction, i. e., requires the longest equalizing bar. This bar is indicated as 20 in the drawing. The beams $e'$ and $f$ have traveled nearly the same distance between mirrors, within the prisms and require substantially the same correction, i. e., the same length of equalizing bars. These bars are indicated as 21 and 22 respectively.

The bars may be arranged, as shown, slightly spaced from the mirror arrangement, or they may be arranged in contact therewith, it being immaterial from an optical point of view whether there is a space between the mirror device and the adjacent ends of the equalizing bars.

Suitable color filters 23, 24, 25 and 26 are positioned in the path of the emerging beams $d$, $e'$ $f$, $g'$. I have indicated filters of red, green, blue and yellow. For certain optical reasons, I prefer to employ a red filter 23 for the beam $g'$, which has been reflected by all of the mirrors and has not passed through any of the semi-transparent mirrors and to employ a blue filter 25 for the beam $d$ which has passed through both of the semi-transparent mirrors. The filters used by the beams $e'$ and $f$ may be respectively yellow and green, as indicated 26 and 24 in Fig. 4.

The semi-transparent mirrors may be formed in any suitable way, as, for example, by precipitating a limited quantity of silver upon the surface which is to be made semi-reflective. This can be done as follows: dissolve 20 grains of silver nitrate in one ounce of distilled water. Add strong ammonia water until the precipitate formed is redissolved and the solution becomes clear. To ¼ ounce of the silver ammonium solution thus formed, add 6 drops of formalin. Hold the surface to be silvered level and pour on to it the combined solution thus formed and let it stand for about 40 seconds, then rinse. Varying the time of application of the silvering solution will vary the density of the silvering.

The prisms should be cemented together with Canada balsam, or other suitable cement.

As an example of dimensions of parts which will produce approximate focusing of all images in one plane, the parts shown in the drawing are drawn approximately to scale from a set of apparatus made of crown glass. The dimensions of the prisms are such that the length of the beam $c$ between mirrors 8 and 10 is ¾ of an inch and the length of the beams $e'$ and $g'$ between mirrors 12 and 13 is ½ of an inch. The lengths of the equalizing or neutralizing bars 20, 21, 22 are respectively approximately 1¾ inches, 1 inch and 11/16 of an inch.

I claim:

In an apparatus of the character described, a unitary structure comprising a prism having two parallel mirror surfaces, one of which is semi-transparent and having a light admitting face at an angle of substantially 45° to the planes of the said parallel mirrors, said prism being arranged to divide a beam of light into two parallel beams; a second prism having two parallel mirror surfaces, one of which is semi-transparent and having a light admitting face at an angle of substantially 45° to the planes of the said parallel mirrors, the light admitting face being in contact with a light exit face of the first mentioned prism, said second prism being arranged to sub-divide both of the two parallel beams to form four parallel beams; a 45° prism filling the space between the first and second prisms and a 45° prism contacting with the semi-transparent mirror face of the second mentioned prism, substantially as and for the purpose described.

In testimony whereof, I have signed my name to this specification this 12th day of July, 1920.

ABRAHAM P. FURMAN.

Witnesses:
WILLIAM SALONI,
ED HAVLIN.